United States Patent [19]

Hoefer et al.

[11] Patent Number: 4,466,447
[45] Date of Patent: Aug. 21, 1984

[54] TAILINGS RETURN TO THRESHING SECTION OR TO CLEANING SECTION

[75] Inventors: Wayne A. Hoefer, Blue Springs; Garry W. Busboom, Independence, both of Mo.

[73] Assignee: Allis-Chalmers Corporation, Milwaukee, Wis.

[21] Appl. No.: 507,029

[22] Filed: Jun. 23, 1983

[51] Int. Cl.³ .............................. A01F 12/52
[52] U.S. Cl. .................. 130/27 F; 130/27 T
[58] Field of Search ............ 130/27 F, 27 T

[56] References Cited

U.S. PATENT DOCUMENTS

| | | | |
|---|---|---|---|
| 2,309,736 | 2/1943 | Makin | 130/27 F |
| 2,433,162 | 12/1947 | Scranton et al. | 130/27 F |
| 3,145,715 | 8/1964 | Horn | 130/27 F |
| 3,202,154 | 8/1965 | Viebrock | 130/27 F |
| 3,482,577 | 12/1969 | De Pauw et al. | 130/27 T |
| 3,630,209 | 12/1971 | Metzger et al. | 130/27 F |
| 3,669,125 | 6/1972 | Rowland-Hill et al. | 130/27 F |
| 4,178,944 | 12/1979 | Hanaway | 130/27 R |
| 4,188,160 | 2/1980 | Corbett et al. | 130/27 F |

FOREIGN PATENT DOCUMENTS

| | | | |
|---|---|---|---|
| 2037446 | 4/1971 | Fed. Rep. of Germany | 130/27 F |
| 1308596 | 10/1962 | France | 130/27 F |

Primary Examiner—Paul J. Hirsch
Attorney, Agent, or Firm—Charles L. Scwab

[57] ABSTRACT

The tailings may be returned to the threshing section of the combine for re-threshing or, at the option of the operator, routed to the cleaning section without passing through the threshing section.

8 Claims, 9 Drawing Figures

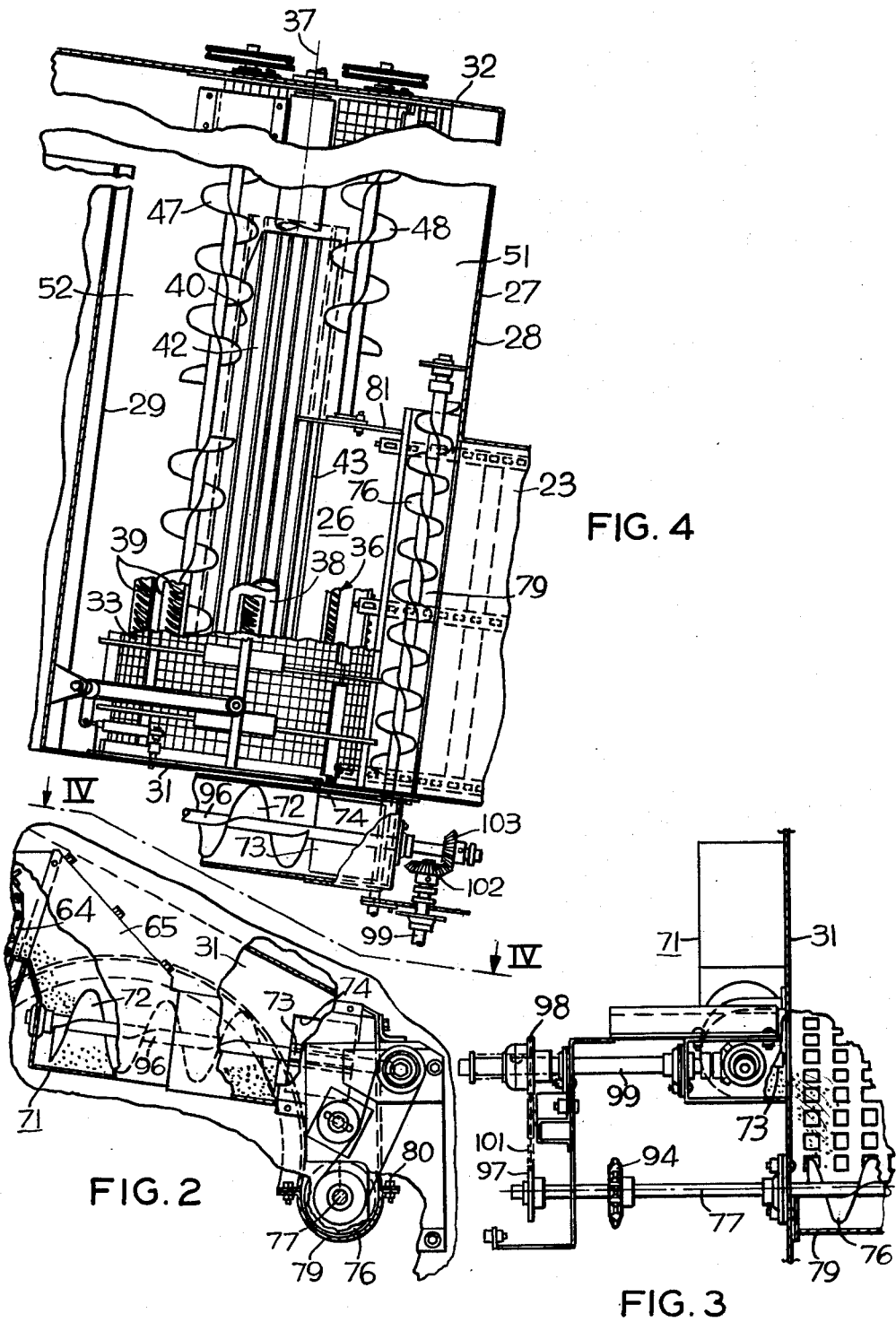

TAILINGS RETURN TO THRESHING SECTION OR TO CLEANING SECTION

RELATED APPLICATION

A similar tailings return system giving the operator the option of returning the tailings to the threshing section or to the cleaning section is shown in co-pending United States patent application of Roger D. Hanaway, entitled "Divertable Tailings Return".

BACKGROUND OF THE INVENTION

Technical Field

This invention relates to agricultural harvesters and more particularly to a mechanism for optionally returning tailings to the threshing section or to the cleaning section of the harvester.

Information Disclosure Statement

The tailings return arrangement of French Pat. No. 1,308,596 issued Oct. 1, 1962 to Cima Compagnie Internationale Des Machines Agricoles McCormick permits the operator to optionally return the tailings to an impeller positioned behind the threshing cylinder or to the cleaning section. A third option available to the operator is to use a screen in the bottom of the tailings elevator to permit the clean grain in the tailings to drop to the cleaning section while the remaining tailings material is returned to the impeller behind the threshing cylinder. In U.S. Pat. No. 4,178,944 issued Dec. 18, 1979 to Roger D. Hanaway, the tailings are returned by a tailings elevator to a distribution auger and are discharged to a pair of accelerator rolls which accelerate the tailings with other threshed material to the cleaning section of the combine. In U.S. Pat. No. 3,482,577 issued Dec. 9, 1969 to R. A. DePauw et al, the tailings are returned to a threshing cylinder of an axial flow combine. The tailings elevator dumps the tailings into a transverse auger conveyor, the last portion of which is perforated to permit clean grain to fall into the cleaning section without passing through the threshing section. In U.S. Pat. No. 3,669,125 issued June 12, 1972 to E. W. Rowland-Hill and H. G. McCarty, the tailings are returned to a pair of axial flow threshing rotors by an auger conveyor. A sliding door is provided at the tailings discharge to one of the rotors to permit the operator to change the flow of tailings to such rotor thereby regulating the division of tailings to the two rotors. In U.S. Pat. No. 2,433,162 issued Dec. 23, 1947 to C. J. Scranton et al, the tailings are returned by elevator and auger to the threshing section of the combine. A partially perforated cylindrical segment, placed in surrounding relation to a section of the cylindrical auger housing having an opening in its lower half, may be rotated to a first position in which the perforations are at the opening to permit clean grain to fall to the cleaning section and may be rotated to a second portion in which a solid cylindrical portion is placed in confronting relation to the opening, thereby causing all tailings to be returned to the threshing section.

SUMMARY OF THE INVENTION

This invention has particular utility in an axial flow combine for harvesting seed or grain from various crops such as wheat, oats, soybeans, corn and the like. The combine includes a threshing section having a housing made up of walls including a pair of laterally spaced vertical side walls extending in the longitudinal direction of the combine, a pair of longitudinally spaced front and rear walls having lower portions converging downwardly, bottom wall means defining a transversely extending discharge opening permitting discharge of threshed material from the threshing section and wall means in the front wall defining a housing inlet opening for receiving crop material to be threshed. A foraminous cylindrical cage extends between the side walls of the housing and includes a cage inlet opening a general longitudinal alignment with the housing inlet opening for receiving crop material to be threshed. A threshing rotor is disposed within the cage on the same horizontal axis as the cage; which axis is disposed transverse to the direction of travel of the combine. A cleaning section is provided in the combine for receiving threshed material discharged from the threshing section by way of the discharge opening in the bottom of the threshing section housing. The cleaning section includes means for separating light particles and tailings from the seed. A transversely extending cylindrical trough is disposed above and in bridging relation to the housing and cage inlet openings. The trough terminates at its inner end in the housing in an elevated position in relation to the discharge opening at the bottom of the housing. An overfeed auger is operatively disposed in the trough on a transverse axis and is rotatably supported on the housing. A longitudinally extending feeder conveyor has its rear end extending through the housing inlet opening and is operative to move crop material to the inlet opening of the cage. A tailings elevator is connected at its lower end to the cleaning section to receive tailings and its upper end is disposed in delivery relation to the overfeed auger. A bottom door is provided in the trough which is selectively movable between a closed position wherein tailings are delivered by the overfeed auger to the housing for gravity flow to the discharge opening in the bottom thereof without passing through the cage and without being threshed by the rotor and an open position wherein the tailings delivered to the overfeed auger drop downwardly onto the rear end of the feeder conveyor the delivery thereby to the inlet opening of the cage whereby the tailings are re-threshed.

In the preferred embodiment of the invention, a longitudinally extending auger conveyor is provided between the upper portion of the tailings elevator and the overfeed auger and has a paddle portion at its end adjacent to the overfeed auger which discharges the tailings through an opening in one side wall to the overfeed auger. The door at the bottom of the overfeed auger trough may be a hinged or sliding door, which may be secured in place by releasable fastening means.

BRIEF DESCRIPTION OF THE DRAWINGS

Several versions of the invention are illustrated in the drawings in which:

FIG. 2 is an enlarged partial side view of the combine showing a portion of the tailings return mechanism;

FIG. 3 is a front view of the apparatus illustrated in FIG. 2;

FIG. 4 is a view taken along the line IV—IV in FIG. 2 with parts broken away for illustration purposes;

DETAILED DESCRIPTION OF THE DRAWINGS

Figure 1:
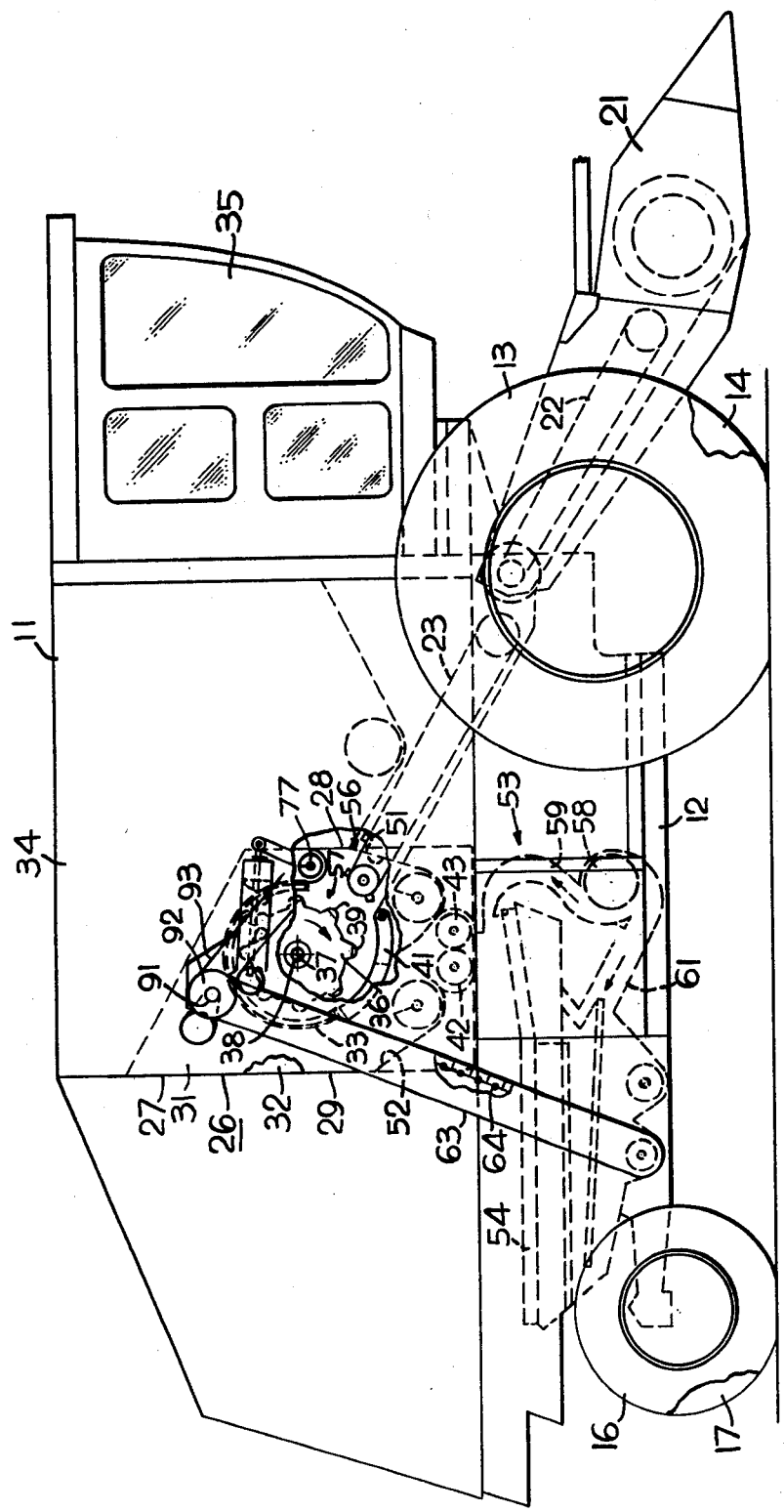
FIG. 1 is a right side view of a combine.

Referring to FIGS. 1 and 4, the combine harvester 11 includes a main frame 12 supported by a pair of front drive wheels 13, 14 and a pair of steerable rear wheels 16, 17. A header 21 is mounted at the front of the combine and includes a lower feeder conveyor 22 which discharges cut crop material at its upper end to the lower end of an upper feeder conveyor 23 which in turn moves the crop material to a threshing section 26 contained within a housing 27 which includes a pair of longitudinally spaced upright front and rear walls 28, 29 and a pair of laterally spaced side walls 31, 32. A foraminous cage 33 is secured at its opposite ends to the side walls 31, 32 by suitable means, not shown. A grain bin 34 is positioned above and in front of the threshing section 26 and an operator's cab 35 is mounted on the frame 12 at the front of the combine. A threshing rotor 36 is disposed within the cage 33 on an axis 37 which is also the axis of the cage 33. A shaft 38 of the rotor 36 is rotatably supported on the axis 37 by bearing means, not shown, on the side walls 31, 32. The rotor 36 includes a plurality of axially extending and circumferentially spaced rasp bars 39.

The crop material delivered by the longitudinally extending upper feeder conveyor 23 passes through an inlet opening 56 in the front wall 28 of the housing 27 and discharges an inlet opening 57 in the cage 33. The inlets 56, 57 are in general longitudinal alignment with one another. The threshing rotor 36 impacts with the incoming crop material moving it across a concave 41. The threshing housing 27 has bottom wall means forming a slot or discharge opening 40 above a pair of accelerator rolls 42, 43. Crop material is distributed to the slot 40 by a pair of distribution augers 47, 48 disposed at the bottom of the housing 27. Threshed crop material passing through the foraminous cage 33 falls by gravity onto the lower downwardly converging portions 51, 52 of the front and rear side walls 28, 29. Threshed material passing through the slot 40 is accelerated downwardly by the accelerator rolls 42, 43 to the cleaning section 53 of the combine.

The cleaning section 53 includes a shoe assembly 54 having the usual grain pan and sieves. A blower 58 provides air by way of ducts 59, 61 for cleaning the threshed grain. Grain which is not completely separated from the hulls will not pass through the sieves and will be delivered to the bottom of a tailings elevator 63 which has an endless chain 64 with flights which move the tailings material to the top of the tailings elevator where it is discharged, as shown in FIG. 2, through a discharge chute 65 to the rear end of a longitudinally disposed auger conveyor 71.

Referring to FIGS. 1 through 4, the material received at the rear end of the auger conveyor 71 is moved by an auger 72 forwardly to a discharge paddle 73 on the auger 72 which kicks or discharges the conveyed tailings through an opening 74 in the side wall 31. The tailings passing through the opening 74 fall by gravity to the laterally outer end of an overfeed auger 76 disposed on a tranverse axis 77 above the upper end of the upper feeder conveyor 23. The auger 76 is operatively disposed in a upwardly open cylindrical trough 79 which is coaxial with the auger 76 and has a laterally inner end which terminates within the housing 27. The opposite ends of the trough 79 are secured to side wall 31 and an intermediate vertical wall 81 by releasable fastening means, not shown. Front and rear flanges of the trough 79 are releasably secured to the front wall 28 and the cage 33 by cap screws 80. The overfeed auger 76 discharges into the housing 27 at a point elevated above the discharge slot 40 whereby the tailings fall by gravity onto the sloping wall 51 and pass to the discharge opening 40. The shaft 77 is driven by the combine engine, not shown, through a power transmission means, not shown. The upper sprocket shaft 91 of the tailings elevator is driven by a chain 93 reeved about a sprocket 92 on the shaft 91 and a sprocket 94 on the shaft 77. An auger shaft 96 of the auger 72 is driven by the shaft 77 through a sprocket 97 thereon, a sprocket 98 on a shaft 99 parallel with auger shaft 77, a chain 101 and bevel gears 102, 103 on shafts 99 and 96.

Figure 5:
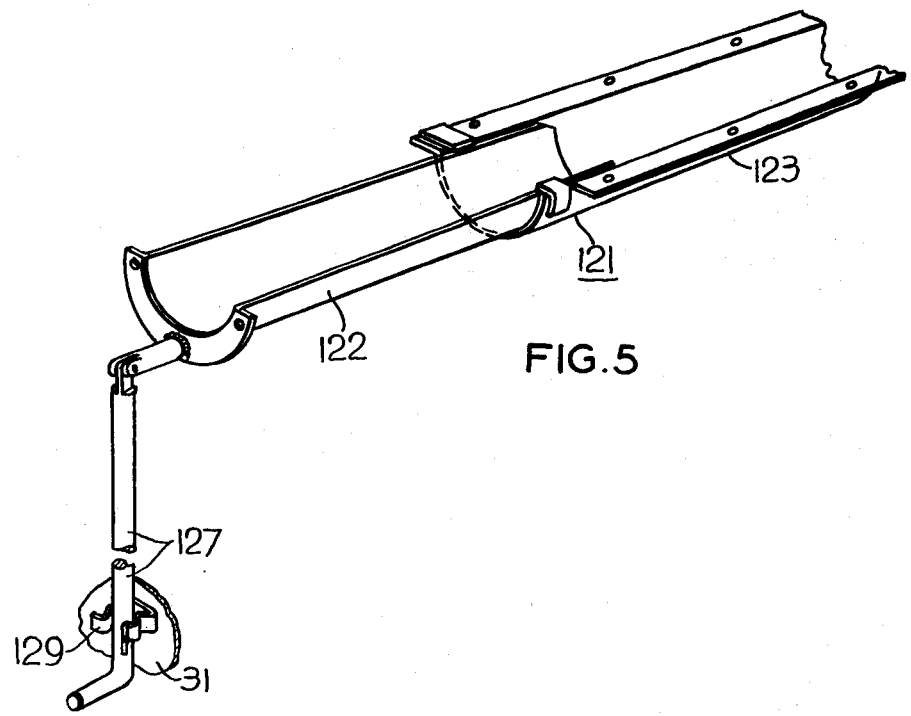
FIG. 5 is a perspective view of the trough illustrated in FIG. 6.
Figure 6:
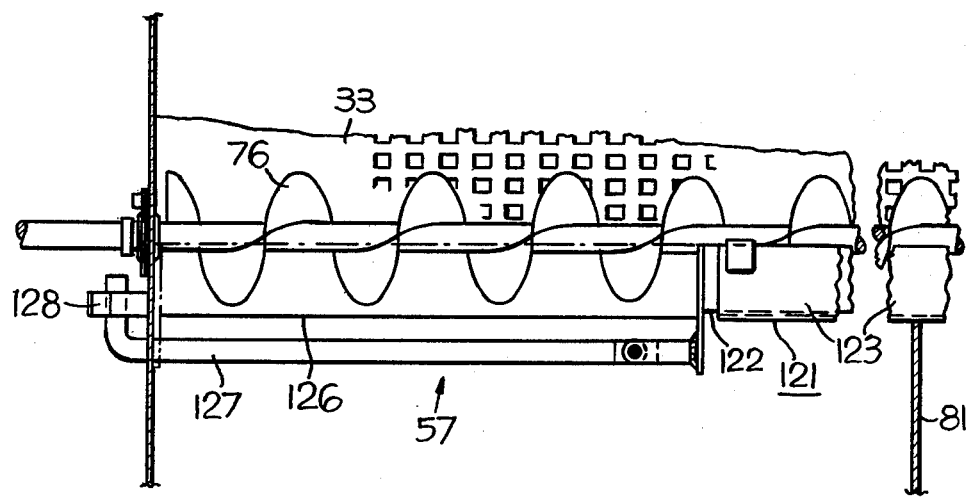
FIG. 6 is a view of an overfeed auger mechanism showing a sliding door in the trough thereof.

Referring to FIGS. 5 and 6, a modified overfeed auger trough 121 is provided wherein a sliding or telescopic cylindrical portion or door 122 is disposed with its laterally inner end on top of a stationary portion 123. In the open position of the sliding portion or door 122, as illustrated in FIG. 5, crop material discharged from the opening 74 to the overfeed auger 76 will pass through an opening 126 in the trough 121 and fall onto the upper end of the feeder conveyer 23 which will move the tailings to the rotor by way of the cage opening 57. In the closed condition of the sliding door 122, tailings delivered to the overfeed auger 76 will be moved by the latter to the interior of the housing where it will fall by gravity to the discharge opening 40 and thence pass through the accelerator rolls 42, 43 which will deliver the material to the cleaning section 53. A handle 127 pivotally connected to the sliding door 122 cooperated with a spring latch 128 to releasably hold the door in its open position, as shown in FIG. 5, and releasable fastening means in the form of a spring latch 129 serves to hold the door 122 in its closed position, as shown in FIG. 6.

Figure 9:
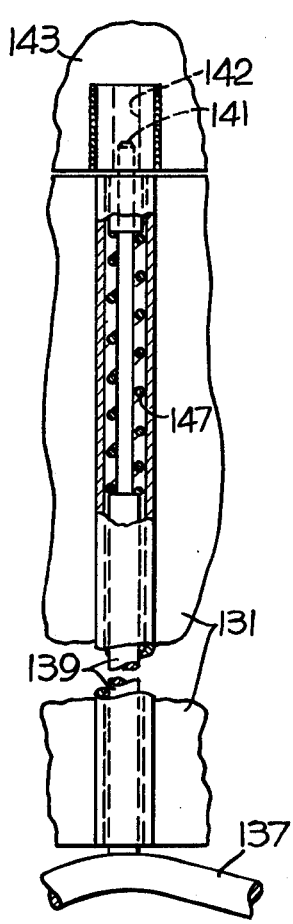
FIG. 9 is an enlarged view of the latching mechanism for the door illustrated in FIGS. 7 and 8.
Figure 8:
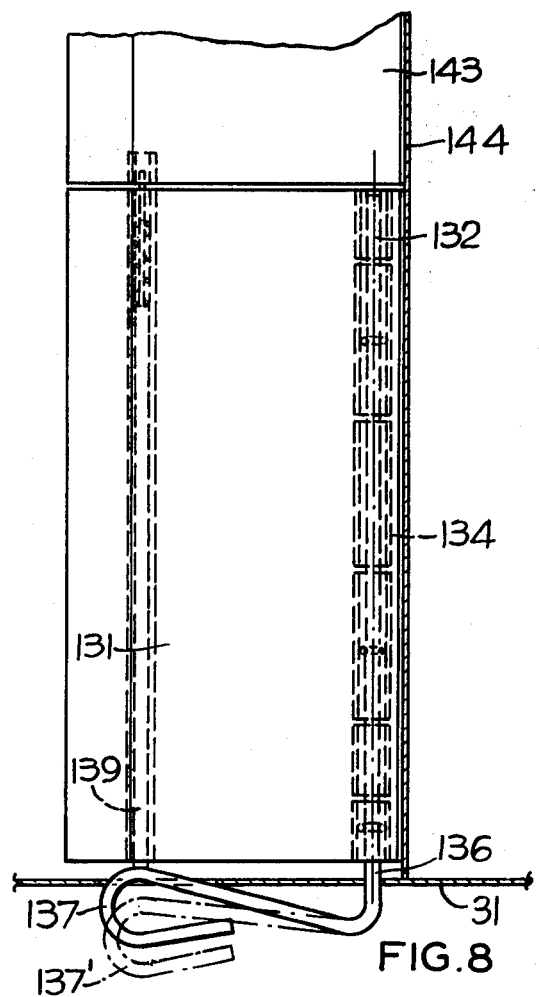
FIG. 8 is a top view of the trough shown in FIG. 7.
Figure 7:
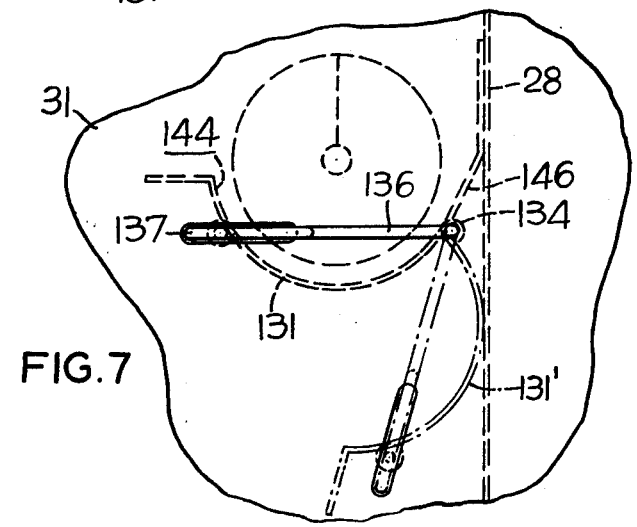
FIG. 7 is an end view of an alternate design for the overfeed auger trough wherein a hinged bottom door is illustrated.

In the embodiment of the invention shown in FIGS. 7, 8 and 9, a cylindrical bottom door 131 is provided on the bottom of a cylindrical trough 144 and is pivotally connected to a portion 146 of the trough secured to the front wall 28 on a transverse pivot axis 132 by a hinge 134. A hinge pin in the form of a rod 136 nonrotatably secured to the door 131 has a resilient handle portion 137 on the laterally outer side of the side wall 31 which bears against a spring biased locking pin 139 to maintain the pin in its locked position as illustrated in FIG. 9, wherein the end 141 of the pin 139 is disposed within a cylindrical opening 142 on the bottom of a fixed portion 143 of the overfeed auger trough 144. When the resilient handle portion 137 of pin 136 is pulled away from the wall 31 to the position shown in broken lines 137', the coil spring 147 will move the locking pin 139 out of its locking position shown in FIG. 9 thereby releasing the door so that it may be moved downwardly to the position shown in broken lines 131' in FIG. 7.

This invention permits the operator to either return the tailings to the cleaning section without passing through the threshing section or return the tailings to the threshing section. Normally the operator will prefer to return the tailings to the cleaning section to avoid possible cracking of the seed, however, under some harvesting conditions it may be necessary to return the tailings to the threshing section in order to obtain separation of the seed from its hull or pod.

The embodiments of the invention in which an exclusive property or privilege is claimed are defined as follows:

1. In an axial flow combine for harvesting seed, the combination comprising:
   a threshing section including
   a housing having walls including a pair of laterally spaced vertical side walls extending in the longitudinal direction of the combine, a pair of longitudinally spaced front and rear walls having lower portions converging downwardly, bottom wall means defining a transversely extending discharge opening permitting discharge of threshed material from the threshing section and wall means in said front wall defining a housing inlet opening for receiving crop material to be threshed,
   a foramious cylindrical cage extending between said side walls, including a cage inlet opening in general alignment with said housing inlet opening for receiving crop material to be threshed, and
   a threshing rotor disposed within said cage, said cage and cylinder being disposed on a horizontal axis disposed transverse to the direction of travel of said combine,
   a cleaning section receiving threshed material discharged from said threshing section by way of said discharge opening, said cleaning section including means for separating light particles and tailings from the seed,
   a transversely extending cylindrical trough disposed above and bridging said inlet openings in said housing and cage terminating at its laterally inner end in said housing in an elevated position in relation to said discharge opening,
   an overfeed auger operatively disposed in said trough on a transverse axis and rotatably supported on said housing,
   a longitudinally extending feeder conveyor having its rear end extending through said housing inlet opening and operative to move crop material to said inlet opening of said cage,
   a tailings elevator connected at its lower end to said cleaning section to receive tailings and having its upper end disposed in delivery relation to said overfeed auger, and
   a bottom door in said trough selectively movable between a closed position wherein said tailings are delivered by said overfeed auger to said housing for gravity flow to said discharge opening of said bottom wall means without passing through said cage and without being threshed by said rotor and an open position wherein said tailings delivered to said overfeed auger drop downward onto the rear end of said feeder conveyor for delivery thereby to said inlet opening of said cage whereby said tailings are re-threshed.

2. The combine of claim 1 wherein said bottom door is a telescopic section of said trough slidable in the axial direction of said trough between said open and closed positions.

3. The combination of claim 1 wherein said bottom door is cylindrical in shape and is hinged on a transverse axis for pivotal movement thereabout between said open and closed positions.

4. In an axial flow combine for harvesting seed, the combination comprising:
   a threshing section including
   a housing having walls including a pair of laterally spaced vertical side walls extending in the longitudinal direction of the combine, a pair of longitudinally spaced front and rear walls having lower portions converging downwardly, bottom wall means defining a transversely extending discharge opening permitting discharge of threshed material from the threshing section and wall means in said front wall defining a housing inlet opening for receiving crop material to be threshed,
   a foraminous cylindrical cage extending between said side walls, including a cage inlet opening in general longitudinal alignment with said housing inlet opening for receiving crop material to be threshed, and
   a threshing rotor disposed within said cage, said cage and cylinder being disposed on a horizontal axis disposed transverse to the direction of travel of said combine,
   a cleaning section receiving threshed material discharged from said threshing section by way of said discharge opening, said cleaning section including means for separating light particles and tailings from the seed,
   an upwardly opening cylindrical trough disposed above and between said cage and housing inlet openings and extending transversely from one of said side walls toward the other of said side walls terminating at its laterally inner end in said housing in elevated relation to said discharge opening,
   a side wall opening in said one side wall above said trough,
   an overfeed auger rotatably supported on said housing and operatively disposed in said trough on a transverse axis,
   a longitudinally extending feeder conveyor operative to move crop material to said inlet opening of said cage,
   a tailings elevator connected at its lower end to said cleaning section to receive tailings and having a discharge chute at its upper end,
   a longitudinally extending auger conveyor having one end in tailings receiving relation to said chute and its other end connected to said side wall opening, said auger conveyor including a longitudinal auger operable to receive tailings from said chute and discharge tailings to said overfeed auger through said side walls opening, and
   a bottom door in said trough selectively movable between a closed position wherein said tailings are delivered by said overfeed auger to said housing for gravity flow to said discharge opening of said bottom wall means without passing through said cage and without being threshed by said rotor and an open position wherein said tailings delivered to said overfeed auger drop downward onto the rear end of said feeder conveyor for delivery thereby to said inlet of said cage whereby said tailings are re-threshed prior to passing to said cleaning section.

5. The combine of claim 4 wherein said longitudinal auger includes a paddle adjacent said side wall opening.

6. The combine of claim 4 wherein said door is a curved panel on the underside of said trough.

7. The combination of claim 6 wherein said curved panel is hinged at its front end for swinging movement between said closed and open positions and further comprising releasable fastening means for maintaining said panel in its closed position.

8. The combine of claim 6 wherein said curved panel is slidable between said open and closed positions.

* * * * *